United States Patent Office 3,217,807
Patented Nov. 16, 1965

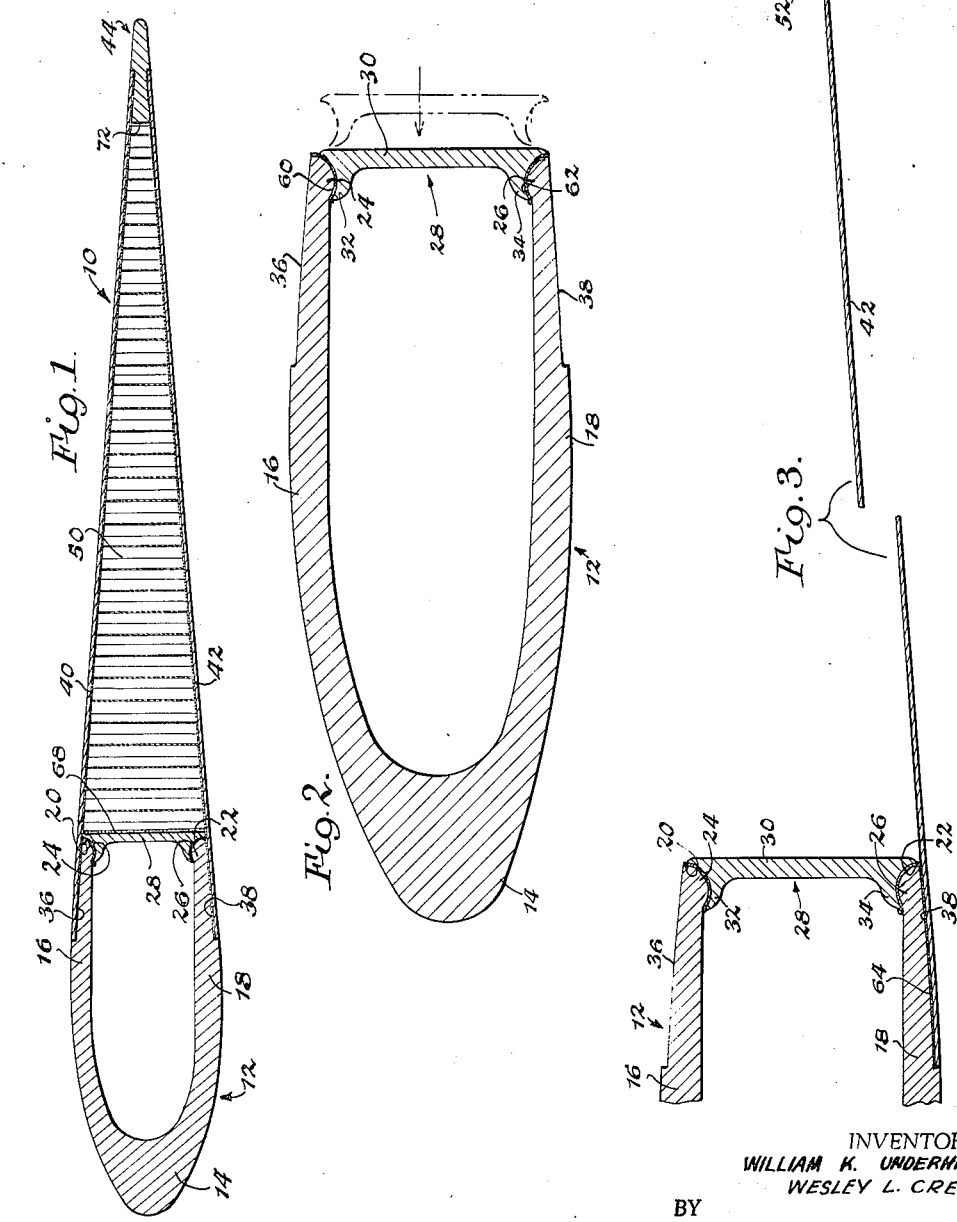

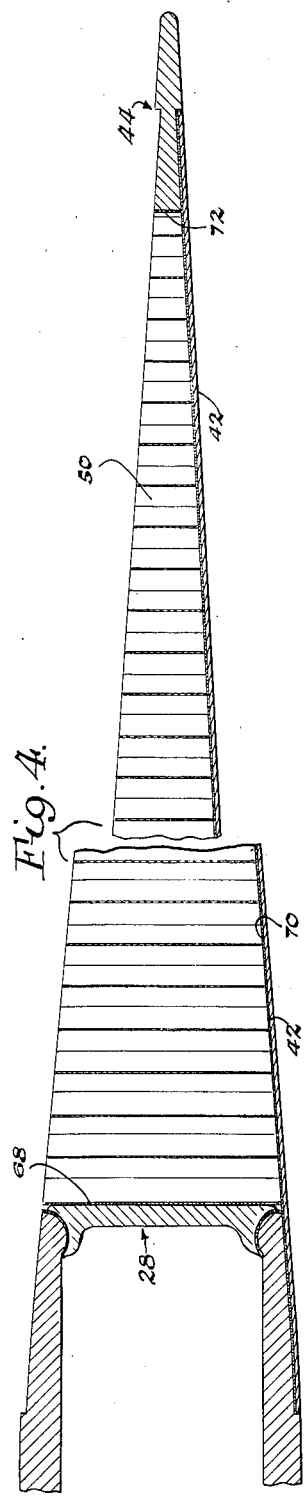
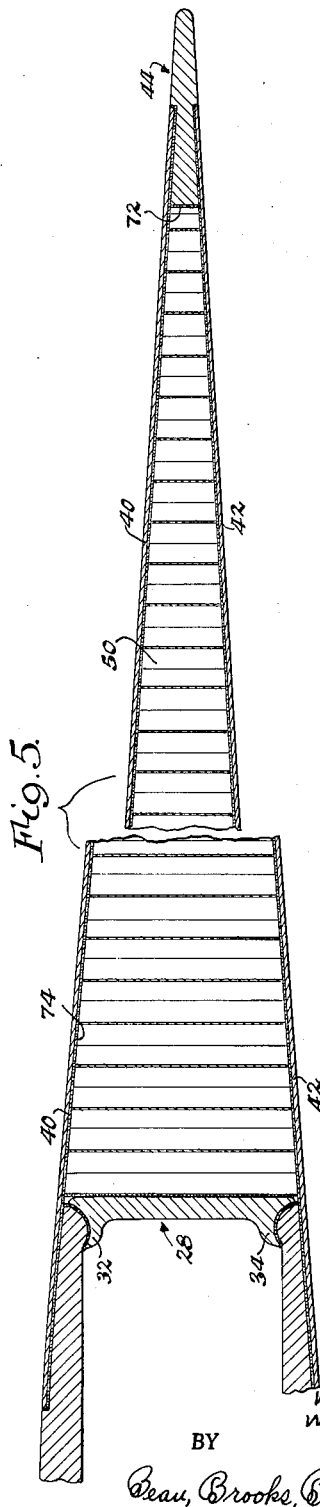

3,217,807
ROTOR BLADE
William K. Underhill, Jr., Dallas, and Wesley L. Cresap, Fort Worth, Tex., assignors to Bell Aerospace Corporation, Wheatfield, N.Y.
Filed Aug. 28, 1964, Ser. No. 392,863
4 Claims. (Cl. 170—159)

This invention relates to rotor blades for helicopters and the like.

It is desirable that the rotor blades for helicopters and the like be both rigid and lightweight and, to this end, such devices are ordinarily constructed of a plurality of structural members suitably joined together as by riveting, welding, adhesive bonding and the like. It is of primary concern in connection with this invention to provide an improved form and method for making a build-up helicopter rotor blade characterized by its rigidity, light weight and economy of construction.

A further requirement in rotor blade construction is the provision of proper location of the chordwise center of balance. The particular location of the mass center at any spanwise point may be the subject of vital concern in order to establish, for the complete assemblage, a mean location which is compatible with the aerodynamic properties of the blade. Furthermore, it is frequently desirable to concentrate the mass of the blade at various spanwise positions (i.e. at the root end or at the tip end of the blade or at both of these points).

More particularly, it is an object of this invention to provide an improved form of rotor blade construction utilizing a number of component parts which form an interrelated composite structure which lends itself not only to ease of fabrication but also to the capability for at least closely approaching the optimum mass balance condition.

Still further, it is an object of this invention to provide a composite rotor blade construction employing a leading edge member having a separate closing bulkhead member and, in combination therewith, a trailing edge piece spaced rearwardly from the bulkhead member and joined thereto by an intervening trapezoidal shaped honeycomb structure and by upper and lower skin plate elements which overlie the honeycomb structure and overlap both the leading and trailing edge members.

Other objects and advantages of the invention will appear from the description hereinbelow and the accompanying drawing wherein:

FIG. 1 is a transverse section taken through a rotor blade constructed in accordance with the present invention;

FIG. 2 is an enlarged sectional view showing the bulkhead joined to the leading edge member;

FIG. 3 is an enlarged sectional view illustrating the lower skin plate attached to the leading edge member-bulkhead and trailing edge member assemblies;

FIG. 4 is an enlarged transverse section similar to FIG. 3 but illustrating the honeycomb structure in place; and FIG. 5 is an enlarged sectional view similar to FIG. 4 but showing the upper skin plate in place.

With reference now more particularly to FIG. 1, the rotor blade is indicated generally therein by the reference character 10 and will be seen to include a leading edge member 12 having a nose portion 14 and a pair of vertically spaced and trailing leg portions 16 and 18. The leg portions 16 and 18 terminate in trailing edge portions 20 and 22 disposed in a common vertical plane and the inner surfaces of each of the leg portions 16 and 18 is provided with a longitudinally extending bead or groove such as the beads indicated by the reference characters 24 and 26, the purpose of which will be presently apparent.

It will be appreciated that the leading edge member 12 may conveniently be formed as an extrusion and, as will be understood, this member is of substantial length commensurate with the length of the rotor blade construction.

A bulkhead member indicated generally by reference character 28 is utilized to join the free trailing edge portions 20 and 22 of the legs 16 and 18 with the web portion 30 of the bulkhead member spanning between the legs 16 and 18 substantially as is shown. The bulkhead assembly 28 is provided with arms 32 and 34 which extend over the beads 24 and 26 of the leg members 16 and 18 in snap-fitted relation therewith to obtain mechanical interengagement between the bulkhead assembly 28 and the leading edge piece 12.

The outer surfaces of the leg portions 16 and 18 are recessed in the vicinity of their trailing marginal edge portions to provide the flats 36 and 38 for receiving the leading marginal edge portions of skin plate members 40 and 42. The trailing edge member indicated generally by reference character 44 is similarly provided with flats 46 and 48 for receiving the trailing edge marginal portions of the skin plates 40 and 42 so that the trailing and leading edge members 12 and 44 are thus rigidly interconnected by these skin plates. Filling the space between the skin plates 40 and 42 is a honeycomb 50 having the cells thereof disposed vertically as shown, it being noted that the honeycomb structure 50 is of trapezoidal shape with one base of the trapezoid being of a length substantially equal to the width of the bulkhead member 28 and being affixed thereto and the smaller base of the trapezoid being of a length substantially equal to the leading edge face 52 of the trailing edge member 44 and being affixed thereto.

With this particular construction, the various component parts thereof are characterized by ease of fabrication and the entire assemblage is also characterized by simplicity of assemblage as will hereinafter be pointed out in more detail. In this respect, it is to be noted that the trapezoidal shape of the honeycomb structure permits this particular member to be much more easily fabricated than would be the case if the non-parallel side to the trapezoid were curved which would otherwise be the case if a more conventional airfoil section were followed. That is to say, the skin plates 40 and 42 are flat to overlie and engage upon the opposite, non-parallel sides of the honeycomb structure 50, to which the intermediate portions of these skin plates are attached so that, as will be evident, not only is it a simple matter to machine the upper and lower surfaces of the honeycomb structure 50, but it is also a simple matter to fabricate the skin plates 40 and 42 since they need no forming or bending but merely require cutting to the requisite size.

As far as the fabrication of the rotor blade assembly is concerned, reference is had now more particularly to FIG. 2. FIG. 2 illustrates the first step in the fabrication process in which the bulkhead assembly 28 is snap-fitted to the leading edge assembly 12, there being interposed between these members layers 60 and 62 of heat-curable adhesive material. After the parts are snapped in place, the two assemblies 12 and 28 are tacked together as by locally applying heat at various spots along the length of the rotor blade. The next step in fabrication is illustrated in FIG. 3 wherein the lower skin plate 42 is engaged with the flats 38 and 40 of the leading and trailing edge members 12 and 44 respectively, heat-curable adhesive being utilized as indicated by reference characters 64 and 66. The skin plate 42 is again spot attached to the members 12 and 44 by local application of heat. Next, as is shown in FIG. 4, a honeycomb structure 50 is fitted in place, adhesive layers 68, 70 and 72 being utilized as shown. The last step is illustrated in FIG. 5 wherein the upper skin plate 40 is placed in engagement within the flats 36 and 46 and a film or layer of adhesive 74 serves to permit attachment of the plate 40 not only to the leading edge member and the trailing edge member, but also to the intervening honeycomb structure 50 as well. During each assembly step as is indicated in the drawings, it is preferred to tack the assemblies in place, although this is not required in the instance of the assembly of the honeycomb structure as is shown in FIG. 4. After the parts have been tacked in place as aforesaid so that they are joined together in the proper relationship, the entire assembly may be engaged in a fixture and placed in an autoclave under heat and pressure-cure the entirety of the adhesive material utilized throughout the assemblage.

The composite construction which results, as is shown in FIGS. 1 and 5, is characterized by extreme rigidity while, at the same time, being of relatively light weight. At the same time, the fabrication techniques, as can be readily appreciated, are extremely simplified due to the configuration and interrelationship between the various component parts of the assemblage.

In addition to the above advantages, the composite construction according to the present invention also presents the possibility for at least very closely achieving the optimum mass balance condition for the finished blade without requiring provision of a large number of balancing weights as is conventional in this particular art. That is to say, it will be noted that the leading edge member 12 is the single most weighty component and, to this end, the sectional area of the nose portion 14 and the widths of the trailing leg portions 16 and 18 may be adjusted and controlled to provide the requisite concentration of mass in this area for establishing, cross sectionally of the blade, the desired mass balance. Further, the trailing leg portions 16 and 18 can be varied in length (i.e. transversely of the blade) at various spanwise points or regions to control the mass balance longitudinally of the blade. Thus, for example, the leg portions 16 and 18 can be narrowed at the intermediate portions of the blade and then widened at the root and tip ends thereof so as to establish a lightweight blade construction which possesses high inertia, as is often desirable. Under such circumstances, the bulkhead member 28 can be prebent along its length to conform to the configuration of the leg portions 16 and 18, it can be fabricated in sectional form or it may be constructed so as to be initially straight and bent during assembly to conform. Likewise, the leading edge portion of the honeycomb slab 50 which abuts the bulkhead 28 is easily machined to conform to the shape required, all without complicating either the fabrication or assembly of the blade construction. By providing flat sides for the honeycomb structure 50, no bending or pre-shaping of the skin elements 40 and 42 is required and of primary importance is the fact that the component parts are so constructed as to interengage and permit of assembly with a minimum of effort and a maximum ability for interconnection and securement while, at the same time, achieving a lightweight, rigid construction.

It is to be understood that certain changes and modifications as illustrated and described may be made without departing from the spirit of the invention or the scope of the following claims.

We claim:

1. A rotor blade construction comprising, in combination,
    an elongate leading edge member having a nose portion and trailing leg portions disposed in vertically spaced relation and projecting rearwardly from said nose portion,
    an elongated bulkhead strip spanning between and interconnecting said trailing leg portions at the free edges thereof,
    a frusto-conical honeycomb slab having flat opposite sides and a wide edge portion secured to said bulkhead strip, presenting its opposite sides substantially as continuations of the outer surfaces of the respective trailing leg portions, and having a narrow edge portion substantially parallel and spaced rearwardly from said bulkhead strip,
    an elongate trailing edge member secured along said narrow edge portion of the honeycomb slab and having upper and lower surfaces disposed substantially as continuation of said opposite sides of the honeycomb slab,
    and a pair of skin plates, each of said skin plates being secured to one side of said honeycomb slab and having forward and rear edge portions overlapping onto and secured to the corresponding of said outer surfaces of the leading and trailing edge members.

2. A rotor construction comprising, in combination,
    an elongate, flat-sided honeycomb slab having a forward edge portion, a rearward edge portion, and upper and lower sides converging from said forward edge portion toward said rearward edge portion,
    a trailing edge member secured to and along said rearward edge portion of the honeycomb slab,
    a bulkhead strip secured to and along said forward edge portion of the honeycomb slab,
    a leading edge member having a nose portion and trailing leg members, said trailing leg members being fixed in abutting relation to said bulkhead strip and being bridged thereby,
    and a pair of skin plates sandwiching said honeycomb slab and edge portions of said trailing and leading edge members therebetween.

3. A rotor blade construction comprising, in combination,
    a leading edge member having a nose portion and vertically spaced leg portions projecting rearwardly therefrom,
    a bulkhead strip spanning between and joining the free rearward edges of said leg portions,
    a wedge-like, flat-sided honeycomb slab secured to the rear face of said bulkhead strip,
    a trailing edge member secured to the rear face of said honeycomb slab,
    and upper and lower skin elements overlapping with and bridging between said leading and trailing edge members and sandwiching said honeycomb structure therebetween,
    the nose portion of said leading edge member being of a mass and the rearwardly extending lengths of said leg portions being such as to optimally locate the mass balance transversely of said blade construction.

4. A rotor blade construction for helicopters and the like, comprising
    an elongate leading edge member having a rounded nose portion and a pair of vertically spaced trailing leg portions,
    a bulkhead member of plate-like configuration bridging between and joining said leg portions along the free edges thereof,
    a trailing edge member of generally triangular section and spaced rearwardly from said bulkhead member,
    a honeycomb member extending between said bulkhead member and said trailing edge member, said honeycomb member being of trapezoidal section having one base substantially coextensive in width with said bulkhead member and joined thereto, and having its smaller base substantially coextensive in width with the base of said trailing edge member and joined thereto,
    and a pair of flat skin plates, one of said skin plates having forward and rear edge portions overlapping and joined respectively to the upper leg of said leading edge member and the upper surface of said trailing edge member, with the intermediate portion of said one skin plate engaging with and secured to the upper surface of said honeycomb member, the other skin plate having forward and rear edge portions overlapping and joined respectively to the lower leg of said leading edge member and the lower surface of said trailing edge member, with the intermediate portion of said other skin plate engaging with and secured to the lower surface of said honeycomb member.

References Cited by the Examiner

UNITED STATES PATENTS

| | | | |
|---|---|---|---|
| 2,469,480 | 5/1949 | Sikorsky | 170—159 |
| 2,620,884 | 12/1952 | Gluhareff | 170—159 |
| 2,771,144 | 11/1956 | Lasserre et al. | 170—159 |
| 3,093,219 | 6/1963 | Ramme | 170—159 |
| 3,123,144 | 3/1964 | Stulen et al. | 170—159 |

SAMUEL LEVINE, *Primary Examiner.*

JULIUS E. WEST, *Examiner.*